United States Patent

Wu

Patent Number: 5,310,155
Date of Patent: May 10, 1994

[54] GOLF CART UMBRELLA HOLDER

[76] Inventor: Ching-Tsang Wu, No. 35-1, Jih Hsin Street, Tu Cheng Hsiang, Taipei Hsien, Taiwan

[21] Appl. No.: 915,661

[22] Filed: Jul. 21, 1992

[51] Int. Cl.⁵ .................................................. F16M 13/02
[52] U.S. Cl. .................................. 248/514; 248/229; 224/274
[58] Field of Search ............... 248/514, 515, 541, 229, 248/225.31, 231.6, 516; 224/274, 186

[56] References Cited

U.S. PATENT DOCUMENTS

| | | | |
|---|---|---|---|
| 1,467,834 | 9/1923 | Bruch | 248/514 |
| 2,733,030 | 1/1956 | Hawthorne | 248/514 |
| 2,822,143 | 2/1958 | Johansen | 248/541 X |
| 3,148,851 | 9/1964 | Condon | 248/515 |
| 3,237,899 | 1/1966 | Lewis | 248/229 X |
| 3,304,035 | 2/1967 | Davis | 248/514 X |
| 3,304,036 | 2/1967 | Davis | 248/541 X |
| 5,152,489 | 10/1992 | Christensen et al. | 224/274 X |

*Primary Examiner*—Rinaldi Rada
*Attorney, Agent, or Firm*—Varndell Legal Group

[57] ABSTRACT

A golf cart umbrella holder comprising a mounting device fastened to the frame of a golf cart by a screw, a clamping device fastened to the mounting device by a screw to hold a socket for holding an umbrella. The clamping device has teeth on a contact wall to the mounting device around a circle respectively meshed with teeth on the mounting device. By changing the meshing order between the teeth on the mounting device and the teeth on the clamping device, the angular position of the umbrella relative to the golf cart is adjusted.

1 Claim, 3 Drawing Sheets

GOLF CART UMBRELLA HOLDER

BACKGROUND AND SUMMARY OF THE INVENTION

The present invention relates to a golf cart umbrella holder for holding an umbrella on a golf cart.

The golf is an outdoor game in which a player using special clubs attempts to sink a ball with as few strokes as possible into each of the 9 or 18 successive holes on a course. While playing on the course, the players may be suffering the beating of the weather. Therefore, a golf player may hold or ask a caddie to hold an umbrella for protection against the sun or rain. However, it is not convenient to carry an umbrella by a golf player oneself.

The present invention has been accomplished under the aforesaid circumstances. It is therefore an object of the present invention to provide a golf cart umbrella holder which can be conveniently fastened to the frame of any of a variety of golf carts for holding an umbrella. It is another object of the present invention to provide a golf cart umbrella holder which can be conveniently adjusted to change the angular position of the umbrella on a golf cart.

To achieve these objects, there is provided a golf cart umbrella holder which is generally comprised of a mounting plate fastened to the frame of a golf cart by screw means, a clamping device fastened to the mounting device by screw means to hold a socket for holding an umbrella. The mounting device is comprised of two symmetrical plates having each a channel through respective inside wall which receives the frame of a golf cart. The channel has a V-groove and two chamfered opposite top edges which make the mounting plate applicable for fastening to any of a variety of golf cart frames. The clamping device has teeth on a contact wall to the mounting device around a circle respectively meshed with teeth on the mounting device. By changing the meshing order between the teeth on the mounting device and the teeth on the clamping device, the angular position of the umbrella relative to the golf cart is adjusted.

DETAILED DESCRIPTION OF THE PREFERRED EMBODIMENT

Figure 1:
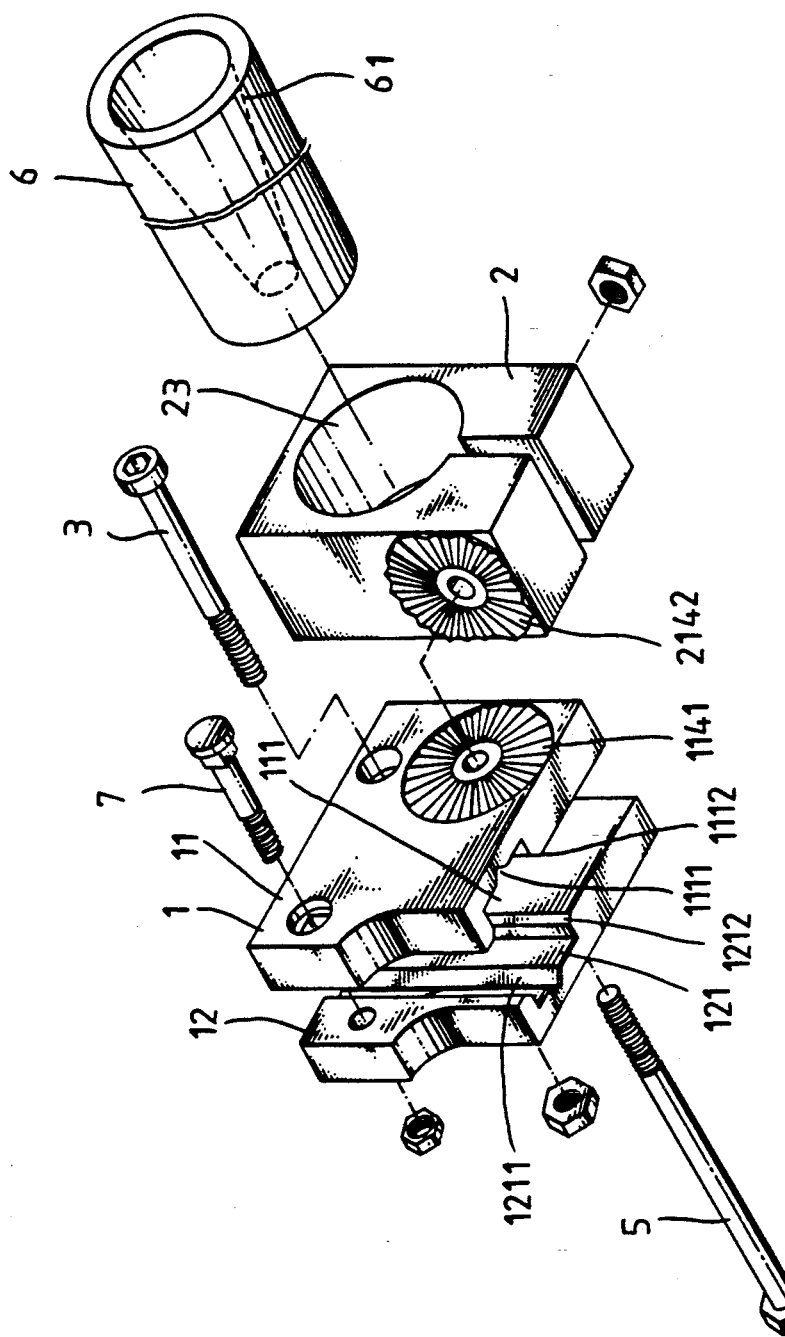
FIG. 1 is an exploded view of a golf cart umbrella holder embodying the present invention.
Figure 2:
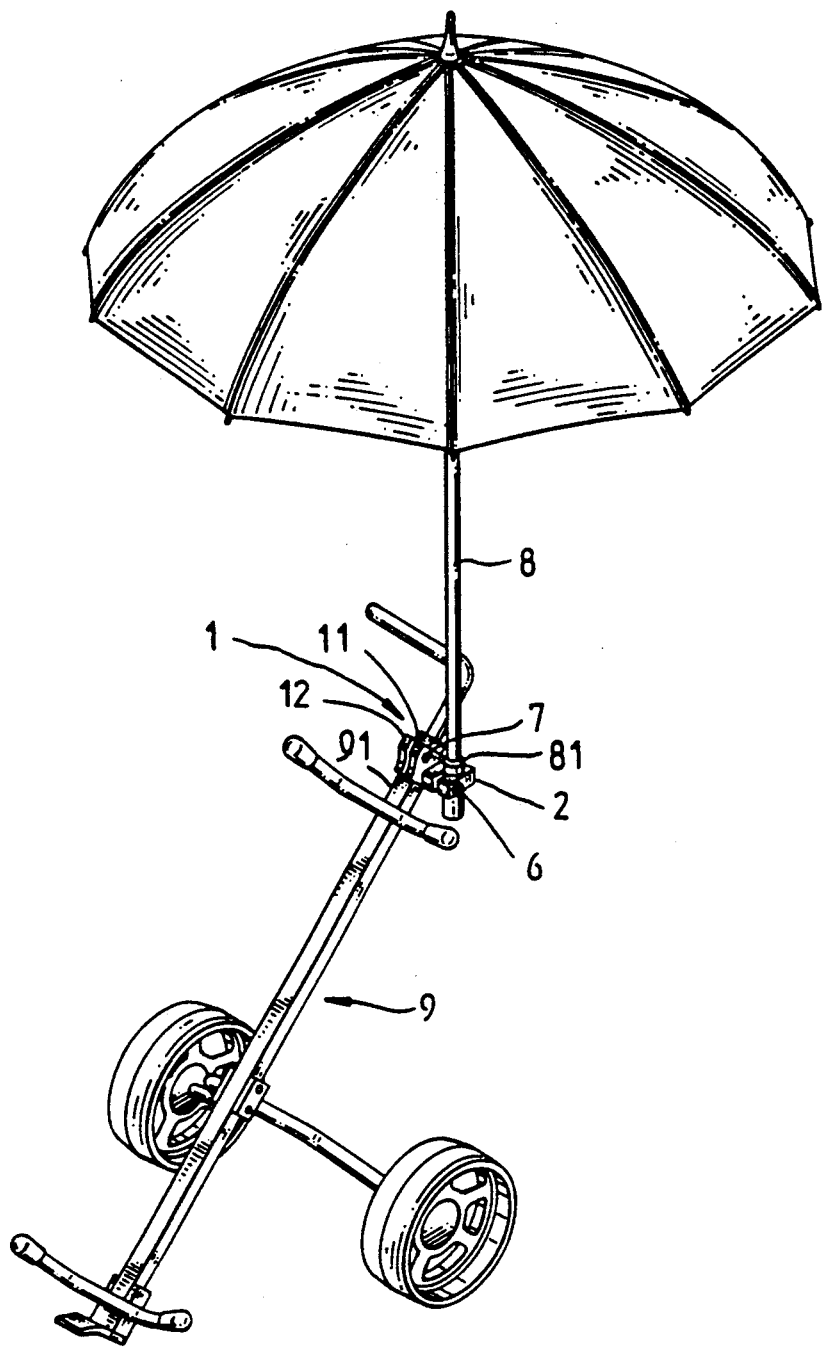
FIG. 2 is an elevational view showing that the golf cart umbrella holder has been fastened to the frame of a golf cart to hold an umbrella.
Figure 3A:
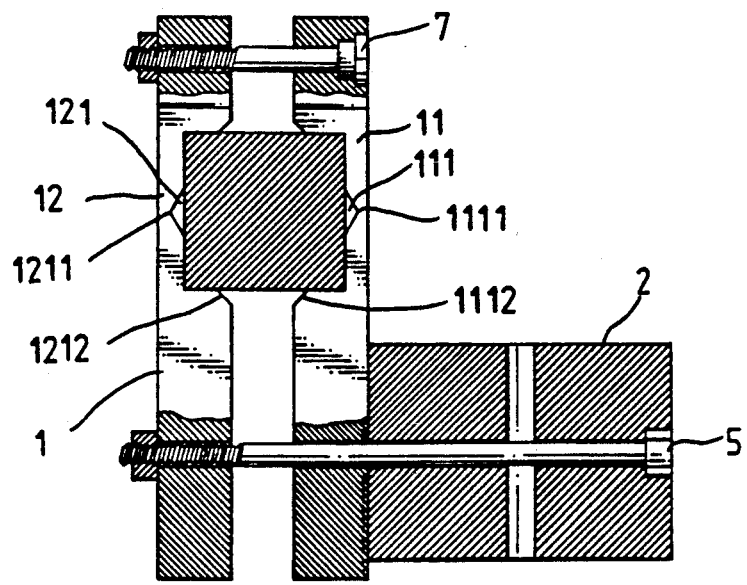
FIG. 3A illustrates that the golf cart umbrella holder is fastened to the frame of a golf cart which has a rectangular cross-section.
Figures 3B, 3C, 3D:
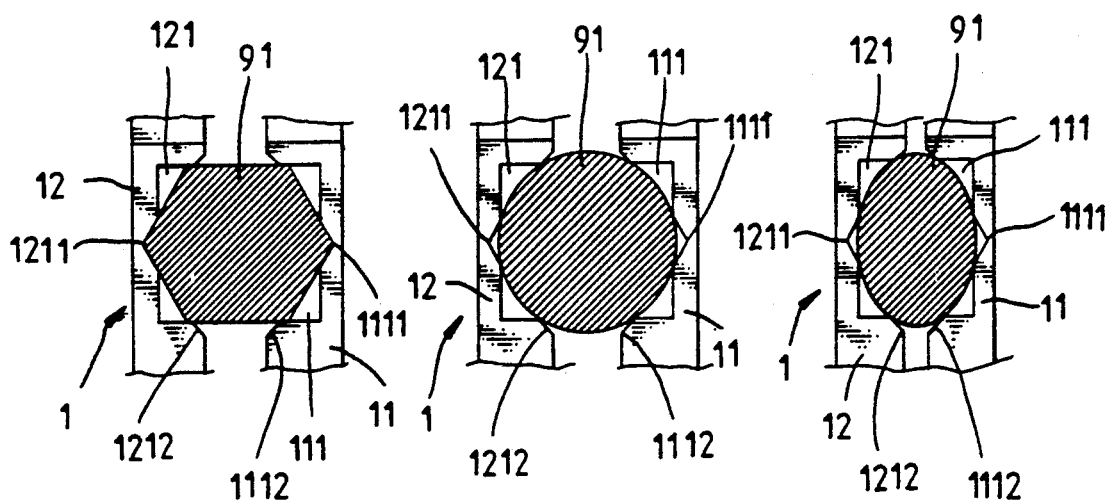
FIG. 3B illustrates that the golf cart umbrella holder is fastened to the frame of a golf cart which has a round cross-section.
FIG. 3C illustrates that the golf cart umbrella holder is fastened to the frame of a golf cart which has an elliptical cross-section.
FIG. 3D illustrates that the golf cart umbrella holder is fastened to the frame of a golf cart which has a hexagonal cross-section.

Referring to FIGS. 1 and 2, a golf cart umbrella holder as constructed in accordance with the present invention is generally comprised of a mounting device 1 fastened to the frame 91 of a golf cart 9 to hold a socket 6 by a clamping device 2 for holding an umbrella 8. The mounting device 1 is consisted of two symmetrical plates 11, 12 each having a channel 111 or 121 on an inside wall thereof, which channel 111 or 121 has a V-shaped groove 1111 or 1211 centrally arranged in the in longitudinal direction, a flat bottom with square corners and two chamfered peripheral top edges 1112 or 1212. At least one of the symmetrical plates 11, 12 has a plurality of teeth 1141 on an outside wall thereof around a circle. The clamping device 2 has an opening 23 which receives the socket 6, and a plurality of teeth 2142 on a peripheral wall thereof around a circle. The socket 6 fits the opening 23 on the clamping device 2 and has a tapered bore 61 through the central axis thereof.

Referring to FIGS. 3A, 3B, 3C, 3D and seeing FIG. 2 again, by means of the arrangement of the V-shaped grooves 1111, 1211 and the chamfered edges 1112, 1212, the two symmetrically plates 11, 12 can be conveniently tightly fastened to any of a variety of golf cart frames 91 by screw bolts 3, 7. Once the mounting device 1 has been fastened to the frame 91 of a golf cart 9, the clamping device 2 is fastened to the mounting device 1 by a screw bolt 5 with the teeth 1141, 2142 meshed or mated, to hold the socket 6 in the opening 23. By inserting the handle 81 of an umbrella 8 in the tapered boring bore 61 on the socket 6, the umbrella 8 is supported on the frame 91 of the golf cart 9 for protection against the sun or rain.

By changing the meshing order between the teeth 1141 on the mounting device 1 and the teeth 2142 on the clamping device 2, the angular position of the umbrella 8 relative to the golf cart 9 is adjusted.

I claim:

1. A golf cart umbrella holder comprising:
    a mounting device secured to a frame of a golf cart, said mounting device including two plates secured around said frame by screw means, said two plates having symmetrical shapes and an inner wall with a channel receiving said frame, said channel having a channel structure for tightly securing said mounting device to said frame where said frame has any one of a plurality of different cross sections including a circle, an oval, a square and a hexagon, said channel structure including two chamfered peripheral top edges, a flat bottom with square corners and a single V-shaped groove centrally arranged in said bottom and extending a length of said channel, one of said plates having an outer wall with a plurality of first teeth arranged in a circle;
    a socket having a tapered bore for holding an umbrella; and
    a clamping device fastened to said mounting device by screw means for holding said socket, said clamping device having an opening which receives said socket and a surface with a plurality of second teeth mating with said first teeth.

* * * * *